United States Patent
Lu et al.

(10) Patent No.: US 10,159,038 B2
(45) Date of Patent: Dec. 18, 2018

(54) WIRELESS NETWORK CONFIGURATION FOR MULTIPLE ACCESS POINTS

(71) Applicant: Verizon Patent and Licensing Inc., Arlington, VA (US)

(72) Inventors: Kevin W. Lu, Bridgewater, NJ (US); Alex M. Madonna, Spring Lake Heights, NJ (US); Akhil Dayal, Short Hills, NJ (US)

(73) Assignee: Verion Patent and Licensing Inc., Basking Ridge, NJ (US)

( * ) Notice: Subject to any disclaimer, the term of this patent is extended or adjusted under 35 U.S.C. 154(b) by 73 days.

(21) Appl. No.: 15/177,062

(22) Filed: Jun. 8, 2016

(65) Prior Publication Data

US 2017/0359774 A1    Dec. 14, 2017

(51) Int. Cl.
    *H04W 48/20*    (2009.01)
    *H04L 29/08*    (2006.01)
    *H04L 29/12*    (2006.01)
    *H04W 60/02*    (2009.01)
    *H04W 88/08*    (2009.01)
    *H04W 84/12*    (2009.01)

(52) U.S. Cl.
    CPC ......... *H04W 48/20* (2013.01); *H04L 61/6022* (2013.01); *H04L 69/323* (2013.01); *H04W 60/02* (2013.01); *H04W 84/12* (2013.01); *H04W 88/08* (2013.01)

(58) Field of Classification Search
    CPC .. H04W 48/20; H04W 60/02; H04L 61/6022; H04L 69/323
    See application file for complete search history.

(56) References Cited

U.S. PATENT DOCUMENTS

| | | | | |
|---|---|---|---|---|
| 2012/0257603 | A1* | 10/2012 | Mercier | H04W 24/02 370/338 |
| 2015/0133122 | A1* | 5/2015 | Chen | H04W 76/025 455/436 |
| 2016/0248633 | A1* | 8/2016 | Turner | H04L 41/0846 |

OTHER PUBLICATIONS

Wikipedia, "TR-069," https://en.wikipedia.org/wiki/TR-069, Jun. 23, 2016, 6 pages.

* cited by examiner

*Primary Examiner* — Brandon M Renner
*Assistant Examiner* — Jay L Vogel

(57) ABSTRACT

A device may receive first information relating to a wireless local area network to be used to communicate with a first access point and one or more second access points. The first information may identify one or more first configuration parameters associated with the first access point. The device may obtain second information from the first access point based on the first information. The second information may identify one or more second configuration parameters associated with the first access point. The one or more second access points, when configured based on the second information, may permit communication via the wireless local area network. The device may provide, to the one or more second access points via the first access point, information for configuring the one or more second access points based on the second information.

20 Claims, 7 Drawing Sheets

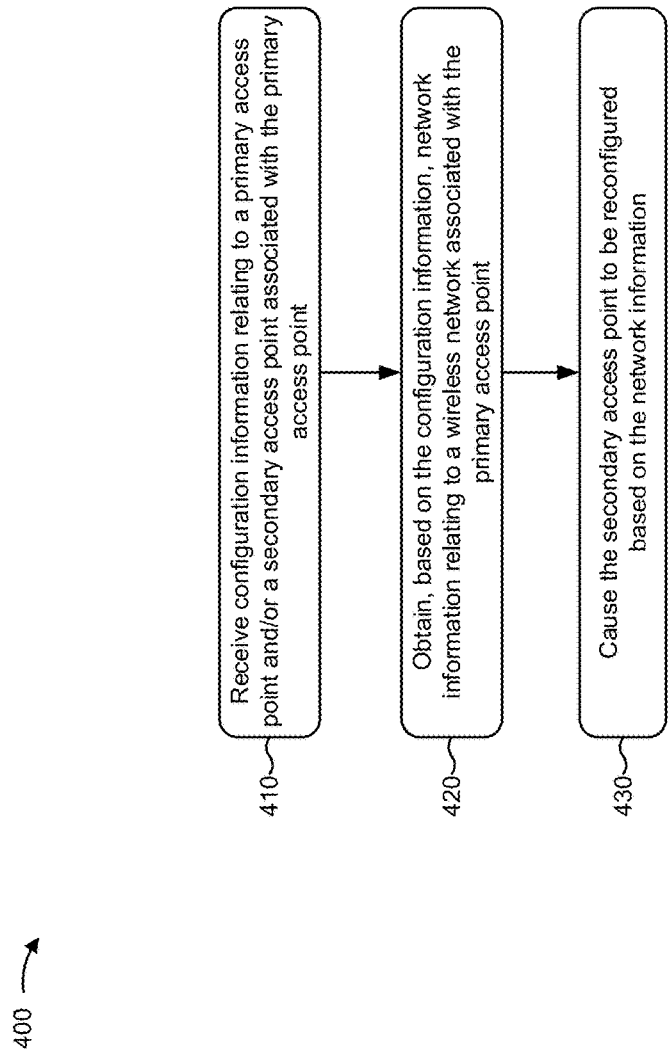

WIRELESS NETWORK CONFIGURATION FOR MULTIPLE ACCESS POINTS

BACKGROUND

A wireless access point may be any device that allows a Wi-Fi compliant device (e.g., a laptop, a tablet, a television, or a smart phone) to connect to a wide area network (WAN) (e.g., the Internet) via a local area network (LAN). A LAN may be a network that connects one or more Wi-Fi compliant devices together over relatively small distances, such as within a single building (e.g., an in-home network) or within a group of buildings (e.g., an office complex). A Wi-Fi compliant device may be any device that operates based on the Institute of Electrical and Electronics Engineers' (IEEE) 802.11 standards. IEEE 802.11 standards are a set of media access control (MAC) and physical layer (PHY) specifications for implementing a wireless LAN.

BRIEF DESCRIPTION OF THE DRAWINGS

FIG. 4 is a flow chart of an example process for configuring a secondary access point based on network information associated with a primary access point.

DETAILED DESCRIPTION OF PREFERRED EMBODIMENTS

The following detailed description of example implementations refers to the accompanying drawings. The same reference numbers in different drawings may identify the same or similar elements.

A primary access point may provide access to an external network (e.g., the Internet, a WAN, etc.) via a wireless network (e.g., a local area network (LAN)). The primary access point may broadcast signals to client devices, such as laptops, televisions, tablets, smart phones, or the like. In some cases, a secondary access point may provide access to the external network via the primary access point. For example, the secondary access point may be connected to the external network via the primary access point, and may broadcast signals for client devices to connect to the wireless network (e.g., using the same credentials that the client devices use to connect to the primary access point). Using the primary access point in combination with the secondary access point may improve coverage of the wireless network.

When the primary access point is reconfigured (either locally or remotely), the configuration of the secondary access point may not be updated accordingly. This may require a user to update the secondary access point based on the configuration changes made to the primary access point, which may be difficult and time consuming.

Implementations described herein permit a configuration device to determine that the primary access point has been reconfigured or is to be reconfigured. Based on this determination, the configuration device may obtain network information, from the primary access point, that identifies configuration parameters of the primary access point and/or of the wireless network (e.g., the LAN) used to communicate with the primary access point. The configuration device may cause the secondary access point to be updated based on the network information obtained from the primary access point. For example, the configuration device may cause configuration parameters of the secondary access point to match the configuration parameters of the primary access point (e.g., by sending instructions to the secondary access point to update a configuration).

In this way, wireless network performance may be improved by improving standardization of configuration parameters, saving time and effort of reconfiguring the secondary access point, and/or reducing degradation of wireless network performance by reducing errors in implementing changes in the secondary access point. Furthermore, implementations described herein may increase access to the external network that would otherwise be impeded by misconfiguration of secondary access points.

Figure 1:
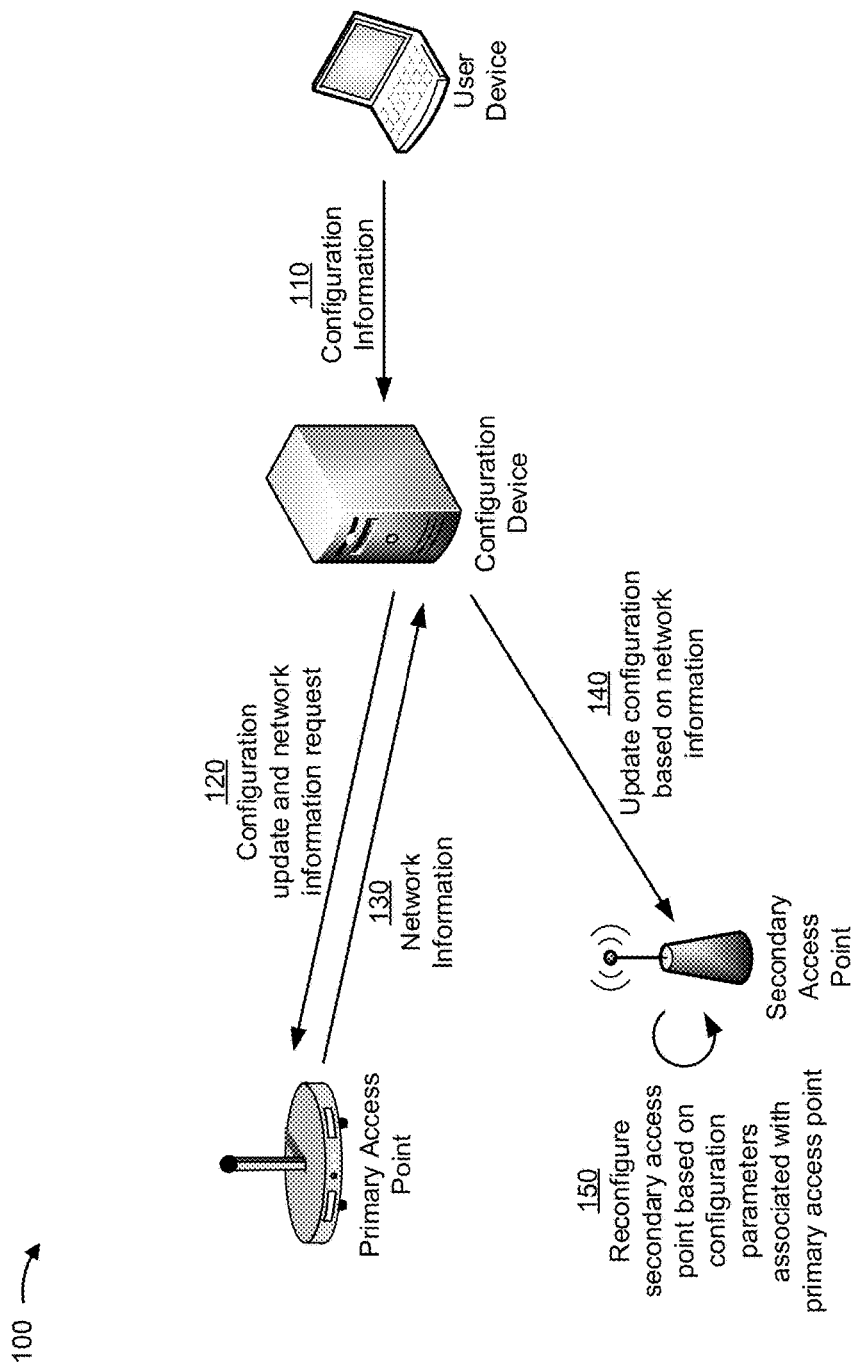
FIG. 1 is a diagram of an overview of an example implementation described herein.

FIG. 1 is a diagram of an overview of an example implementation 100 described herein. As shown in FIG. 1, and by reference number 110, a configuration device may receive, from a user device, configuration information relating to a primary access point and/or a secondary access point associated with the primary access point. For example, a network operator may interact with the user device to input the configuration information, and the user device may provide the configuration information to the configuration device. In some implementations, the configuration information may identify one or more configuration parameters of the primary access point or a change to one or more configuration parameters of the primary access point (e.g., one or more credentials for accessing the wireless network, channel parameters of the wireless network, a service set identifier (SSID), etc.).

As shown by reference number 120, based on the configuration information received from the user device, the configuration device may provide a configuration update and a network information request to the primary access point. As shown by reference number 130, the configuration device may obtain network information from the primary access point based on the network information request. The network information may include configuration parameters relating to a wireless network used to communicate with the primary access point.

As shown by reference number 140, the configuration device may cause the configuration of a secondary access point to be updated based on the network information received from the primary access point. As shown by reference number 150, the secondary access point may be reconfigured based on configuration parameters associated with the primary access point. For example, the configuration device may cause the secondary access point to perform self-reconfiguration based on the network information obtained from the configuration device.

In this way, when changes are made to the configuration of the primary access point, the configuration device may cause the secondary access point to be reconfigured based on configuration parameters associated with the primary access point, thus saving time and effort, and/or reducing degradation of wireless network performance by reducing errors in implementing changes in the secondary access point. Further, the configuration device may increase access to the external network that would otherwise be impeded by misconfiguration of secondary access points.

Although the configuration device is described in FIG. 1 as receiving the configuration information from a user device, in some implementations, the configuration information may be received from the primary access point (e.g., when the primary access point is reconfigured locally) or from the secondary access point (e.g., when the secondary access point is reconfigured locally, or when the secondary access point is associated with an activation or registration process).

As indicated above, FIG. 1 is provided merely as an example. Other examples are possible and may differ from what was described with regard to FIG. 1.

Figure 2:
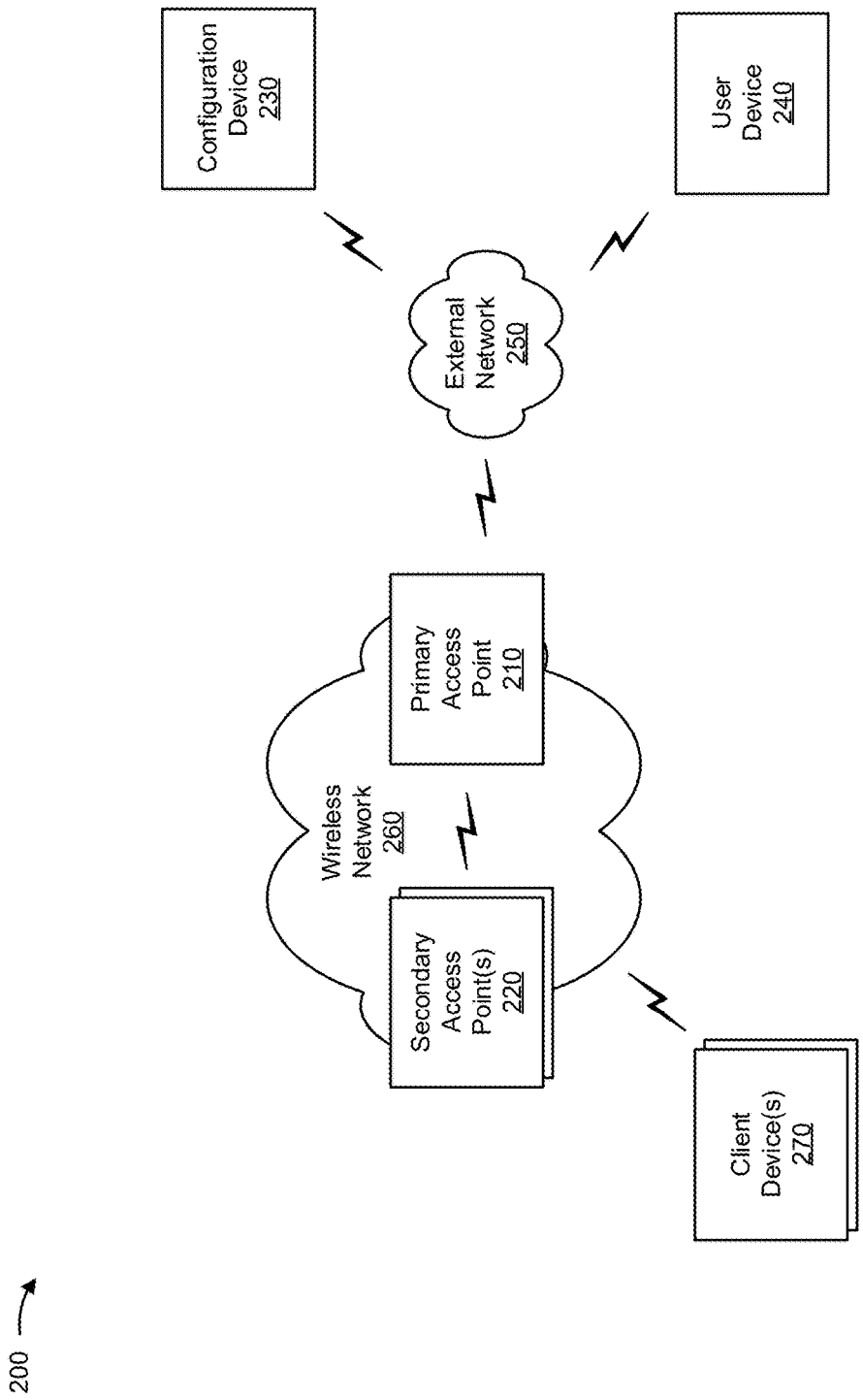
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a primary access point 210, one or more secondary access points 220 (hereinafter referred to collectively as "secondary access points 220," and individually as "secondary access point 220"), a configuration device 230, a user device 240, an external network 250, a wireless network 260, and one or more client devices 270. Devices of environment 200 may interconnect via wired connections, wireless connections, or a combination of wired and wireless connections.

Primary access point 210 includes one or more devices that provide access to external network 250 via wireless network 260 used to communicate with primary access point 210. For example, primary access point 210 may include a wireless router, a wireless access point, a gateway, a mobile hotspot, or the like.

Secondary access point 220 includes one or more devices that provide access to external network 250 via primary access point 210. For example, secondary access point 220 may include a wireless router, a wireless access point, a Wi-fi extender, a Wi-fi repeater, a Wi-fi booster, a gateway, or the like. In some implementations, secondary access point 220 may provide access to external network 250 via wireless network 260 to which client devices 270 may connect using the same credentials as when connecting to primary access point 210.

Configuration device 230 includes one or more devices capable of receiving, storing, processing, generating, and/or providing configuration information and/or network information relating to primary access point 210 and/or secondary access point 220. For example, configuration device 230 may include a communication and/or computing device, such as a server, a group of servers, a cloud computing environment, or a similar type of device.

User device 240 includes one or more devices capable of receiving, generating, storing, processing, and/or providing information relating to configuring a wireless network. For example, user device 240 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

External network 250 includes one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Wireless network 260 includes one or more LANs that provide access to external network 250 for client devices 270. For example, wireless network 260 includes a wireless LAN (a WLAN), such as a Wi-fi network, a Bluetooth network, or the like. Wireless network 260 may be provided by primary access point 210 and/or secondary access point 220.

Client device 270 includes one or more devices capable of receiving and/or providing information via wireless network 260. For example, client device 270 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
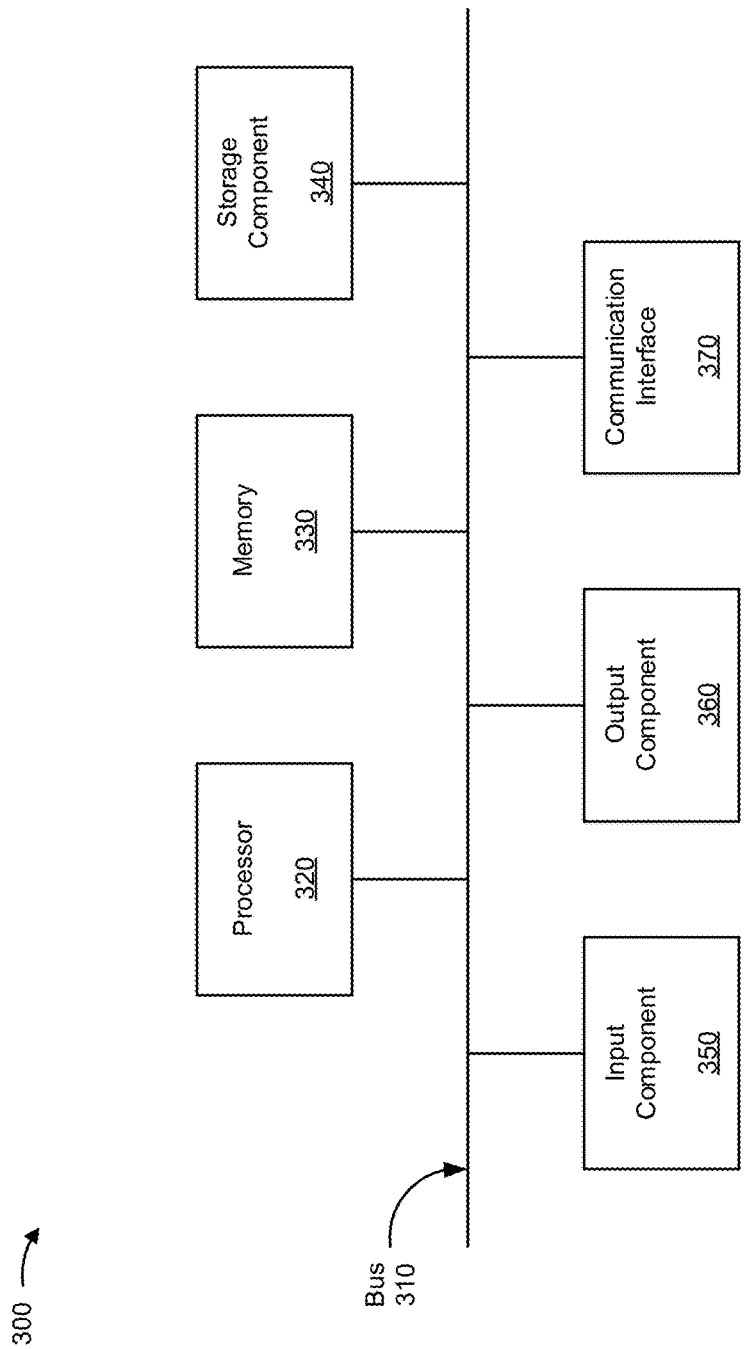
FIG. 3 is a diagram of example components of one or more devices of FIG. 2.

FIG. 3 is a diagram of example components of a device 300. Device 300 may correspond to primary access point 210, secondary access point 220, configuration device 230, user device 240, and/or client device 270. In some implementations, primary access point 210, secondary access point 220, configuration device 230, user device 240, and/or client device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring a secondary access point based on network information associated with a primary access point. In some implementations, one or more process blocks of FIG. 4 may be performed by configuration device 230. In some implementations, one or more process blocks of FIG. 4 may be performed by another device or a group of devices separate from or including configuration device 230, such as primary access point 210, secondary access point 220, user device 240, and/or client device 270.

As shown in FIG. 4, process 400 may include receiving configuration information relating to a primary access point and/or a secondary access point associated with the primary access point (block 410). For example, configuration device 230 may receive configuration information relating to primary access point 210 and/or secondary access point 220. The configuration information may identify one or more configuration parameters of primary access point 210 or a change to one or more configuration parameters of primary access point 210.

In some implementations, a configuration parameter of primary access point 210 (or a change in a configuration parameter of primary access point 210) may relate to wireless network 260. For example, a configuration parameter of primary access point 210 may relate to a quantity of devices permitted to be connected to wireless network 260, a signal strength of a signal associated with wireless network 260 (e.g., five milliwatts (mW), ten mW, or twenty mW), a time of day, a channel parameter (e.g., channel name/number or channel width used for wireless network 260, such as 5 megahertz (Mhz), 12 Mhz, or 22 Mhz), a beacon interval used by primary access point 210 and/or secondary access point 220 (e.g., one millisecond, 50,000 milliseconds, or 65,000 milliseconds), a data rate to be provided via wireless network 260 (e.g., 1 megabit per second (Mbps)), 2 Mbps, 5.5 Mbps, or 11 Mbps), a security type based on which to connect to wireless network 260 (e.g., Wired Equivalent Privacy (WEP), Wi-Fi Protected Access (WPA), WPA2, or WPA2-Advanced Encryption Standard (WPA2-AES)), a credential based on which to connect to wireless network 260 (e.g., username or password), a service set identifier (SSID) associated with wireless network 260 (e.g., a network name), a sensitivity range of primary access point 210 or secondary access point 220 (e.g., an automatically determined sensitivity range or a sensitivity range with a specified acknowledgment time limit), an authentication type associated with wireless network 260, a multiple-input multiple-output (MIMO) transmission speed of primary access point 210 or secondary access point 220, a transmit power range of primary access point 210 or secondary access point 220, a Bluetooth co-existence mode setting for primary access point 210 or secondary access point 220, or the like.

In some implementations, configuration device 230 may receive the configuration information from user device 240. For example, a user may input configuration information into user device 240 (e.g., based on interacting with a configuration interface provided by user device 240). The user may be, for example, a consumer that is implementing primary access point 210 or secondary access point 220, a network technician that is configuring primary access point 210 or secondary access point 220, or the like. After the user inputs configuration information to user device 240, user device 240 may provide the configuration information to configuration device 230.

In some implementations, configuration device 230 may receive the configuration information from primary access point 210. For example, a user may locally reconfigure primary access point 210 (e.g., using an interface of a client device, such as a laptop, a television, a tablet, or a smart phone, that is connected with primary access point 210), and primary access point 210 may provide, to configuration device 230, configuration information based on the reconfiguration. Additionally, or alternatively, configuration device 230 may receive the configuration information as part of an activation or registration process of primary access point 210 and/or secondary access point 220. For example, a user may activate or register primary access point 210 and/or secondary access point 220 to cause primary access point 210 and/or secondary access point 220 to provide configuration information to configuration device 230, and may specify configuration information for primary access point 210 and/or secondary access point 220.

In some implementations, configuration device 230 may receive the configuration information from secondary access point 220. For example, a user may locally reconfigure secondary access point 220 (e.g., using an interface of client device 270 that is connected with secondary access point 220), and secondary access point 220 may provide configuration information to configuration device 230 (e.g., via primary access point 210).

In some implementations, primary access point 210 may automatically (e.g., without user input) determine configuration information, and may provide the configuration information to configuration device 230. For example, assume that primary access point 210 determines that a first channel of wireless network 260 is associated with more interference than a second channel. In such a case, primary access point 210 may determine configuration information indicating to communicate via wireless network 260 using the second channel. By automatically determining configuration information, primary access point 210 may improve wireless network performance and reduce input from a user of user device 240.

In some implementations, configuration device 230 may cause primary access point 210 to be configured based on the configuration information. For example, when configuration device 230 receives the configuration information from user device 240, configuration device 230 may provide the configuration information to primary access point 210, and may cause primary access point 210 to implement the configuration information. In this way, configuration device 230 permits remote reconfiguration of primary access point 210, which may improve wireless network performance.

As further shown in FIG. 4, process 400 may include obtaining, based on the configuration information, network information relating to a wireless network associated with the primary access point (block 420). For example, based on a wireless network associated with primary access point 210 being reconfigured, configuration device 230 may obtain network information relating to wireless network 260. Configuration device 230 may obtain the network information in order to reconfigure secondary access point 220 based on a configuration of primary access point 210. For example, a reconfiguration of one or more configuration parameters of primary access point 210 may cause changes in other configuration parameters, and configuration device 230 may obtain network information relating to the other configuration parameters that may have been reconfigured.

In some implementations, the network information may include the configuration information. For example, when configuration information associated with primary access point 210 is updated, primary access point 210 may provide the configuration information to configuration device 230. Configuration device 230 may provide the configuration information to secondary access point 220 to cause secondary access point 220 to implement the configuration information. Additionally, or alternatively, the network information may be different than the configuration information. For example, assume that the configuration information changes a channel bandwidth of primary access point 210. In such a case, other channel parameters of primary access point 210 may change (e.g., channel names, channel numbers, etc.). Configuration device 230 may obtain network information describing the other channel parameters, and may provide the configuration information and/or the network information to secondary access point 220 to cause secondary access point 220 to be reconfigured.

To obtain the network information, configuration device 230 may transmit a network information request to primary access point 210. Based on the network information request, primary access point 210 may provide the network information to configuration device 230. Additionally, or alternatively, primary access point 210 may provide network information to configuration device 230 periodically (e.g., once per minute, once per hour, once per day, etc.). Additionally, or alternatively, primary access point 210 may provide network information to configuration device 230 based on an initial configuration of primary access point 210 (e.g., an activation or registration process) or a reconfiguration of primary access point 210. Additionally, or alternatively, primary access point 210 may determine that a change to a first configuration parameter is associated with a change to a second configuration parameter, and may provide network information identifying the first configuration parameter and/or the second configuration parameter.

Additionally, or alternatively, primary access point 210 may provide network information to configuration device 230 in association with configuration information. For example, when primary access point 210 provides configuration information to configuration device 230, primary access point 210 may provide network information in association with the configuration information. In this way, processor and/or network resources that would otherwise be used to transmit the network information request may be conserved.

In some implementations, the network information may include information relating to the wireless network used to communicate with primary access point 210 and/or secondary access point 220. For example, network information may identify network addresses of primary access point 210 and/or secondary access point 220, signal strength parameters relating to signals broadcasted by primary access point 210 and/or secondary access point 220, wireless standards associated with wireless network 260, client devices 270 that are authorized to access wireless network 260, a quantity of devices permitted to be connected to wireless network 260, blacklisted devices that are not permitted to connect to wireless network 260, whitelisted devices that are permitted to connect to wireless network 260, wireless channels on which primary access point 210 and/or secondary access point 220 are to broadcast wireless network 260, a spectral range of wireless network 260, a sensitivity range of primary access point 210 and/or secondary access point 220, an authentication type associated with wireless network 260, MIMO transmission speeds of primary access point 210 and/or secondary access point 220, a transmit power range of primary access point 210 and/or secondary access point 220, a Bluetooth co-existence mode of primary access point 210 and/or secondary access point 220, a beacon interval range of primary access point 210 and/or secondary access point 220, a particular data rate setting of primary access point 210 and/or secondary access point 220, a particular security type associated with wireless network 260, or the like.

The network information may permit primary access point 210 and secondary access point 220 to be configured to provide a wireless network with the same or similar configuration parameters. For example, assume that client device 270 is configured to connect to a wireless network provided by one of primary access point 210 and secondary access point 220 based on particular configuration parameters. When secondary access point 220 is configured based on network information obtained from primary access point 210, client device 270 may be capable of connecting to wireless network 260, irrespective of whether client device 270 connects to wireless network 260 via primary access point 210 or via secondary access point 220, based on the particular configuration parameters. Thus, configuration and implementation of primary access point 210 and secondary access point 220 are simplified.

In some implementations, configuration device 230 may identify particular network information that may be affected by the configuration information, and may transmit a network information request for the particular network information. For example, if the configuration information identifies a modification to a security type of wireless network 260, configuration device 230 may determine that one or more credentials may be affected by the modification to the security type, and may obtain network information identifying configuration parameters of the one or more credentials. As another example, if the configuration information identifies a modification to a spectral band or a channel width of primary access point 210, configuration device 230 may determine that channel identifiers or other channel information may be affected by the modification to the spectral band or the channel width, and may obtain network information identifying configuration parameters of the channel identifiers or other channel information. In some implementations, the network information obtained by configuration device 230 may include a subset of network information (e.g., less than all of the network information) associated with primary access point 210. In this way, resources of primary access point 210 that would otherwise be used to provide an entirety of the network information associated with primary access point 210 may be conserved.

In some implementations, configuration device 230 may obtain a particular set of network information each time that configuration device 230 determines that primary access point 210 has been reconfigured, irrespective of which configuration parameters of primary access point 210 are reconfigured. Additionally, or alternatively, configuration device 230 may obtain all of the network information associated with primary access point 210 each time that configuration device 230 determines that primary access point 210 has been reconfigured. In this way, resources of configuration device 230, that would otherwise be used to identify network information to obtain, may be conserved.

In some implementations, configuration device 230 may communicate with primary access point 210 and/or secondary access point 220 based on a particular communication protocol, such as the Customer Premises Equipment (CPE) WAN Management Protocol (CWMP) published by the Broadband Forum as Technical Report (TR)-069. TR-069 specifies Remote Procedure Calls (RPC), which may be used by devices of environment 200 to communicate with each other. For example, Remote Procedure Calls (RPC) may be used to initiate a session between configuration device 230, primary access point 210, secondary access point 220, and/or user device 240. Remote Procedure Calls (RPC) also may be used to obtain and/or set configuration information values for primary access point 210 and/or secondary access point 220. Remote Procedure Calls (RPC) also may be used to obtain network information from primary access point 210 and/or secondary access point 220.

As further shown in FIG. 4, process 400 may include causing the secondary access point to be reconfigured based on the network information (block 430). For example, configuration device 230 may cause secondary access point 220 to be reconfigured based on the network information received from primary access point 210. To cause secondary access point 220 to be reconfigured, configuration device 230 may provide, to secondary access point 220, an instruction to modify configuration parameters identified by the configuration information and/or the network information. By causing secondary access point 220 to be reconfigured, configuration device 230 may cause wireless networks provided by primary access point 210 and secondary access point 220 to have similar or the same configuration parameters. In this way, the time and effort used to configure the wireless network may be reduced, and consistency of configuration parameters between primary access point 210 and secondary access point 220 may be improved, thus improving wireless network performance.

In some implementations, configuration device 230 may cause primary access point 210 to be reconfigured based on the configuration information and/or network information. For example, when parameters relating to secondary access point 220 are changed, configuration device 230 may obtain network information from secondary access point 220, and may cause parameters relating to primary access point 210 to be changed (e.g., to cause the parameters of primary access point 210 to match and/or approximate the parameters associated with secondary access point 220). In this way, configuration device 230 improves uniformity of wireless network configuration and thereby improves wireless network performance.

In some implementations, configuration device 230 may cause multiple secondary access points 220 to be reconfigured. For example, primary access point 210 may be in communication with multiple, different secondary access points 220, and configuration device 230 may cause each of the multiple, different secondary access points 220 to be reconfigured based on configuration parameters of primary access point 210. In this way, configuration device 230 improves wireless network coverage and reduces inconsistency in configuration of multiple, different wireless access points.

In this way, configuration device 230 may receive configuration information from primary access point 210 or secondary access point 220, and may cause primary access point 210 and/or secondary access point 220 to be reconfigured based on the configuration information. By causing primary access point 210 and/or secondary access point 220 to be configured based on the configuration information, configuration device 230 saves time, effort, and resources that would otherwise be used to reconfigure primary access point 210 and/or secondary access point 220 (e.g., manually).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
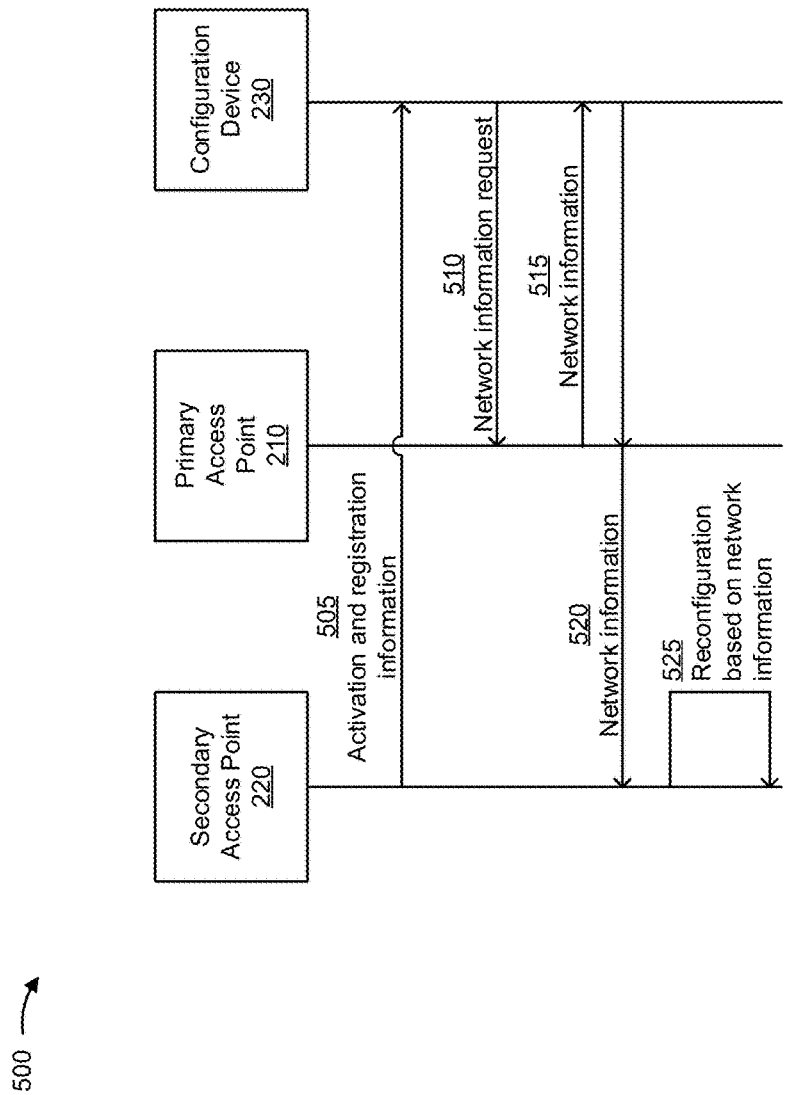
FIGS. 5A-5C are call flow diagrams of example call flows for configuring a secondary access point based on network information associated with a primary access point.
Figure 5B:
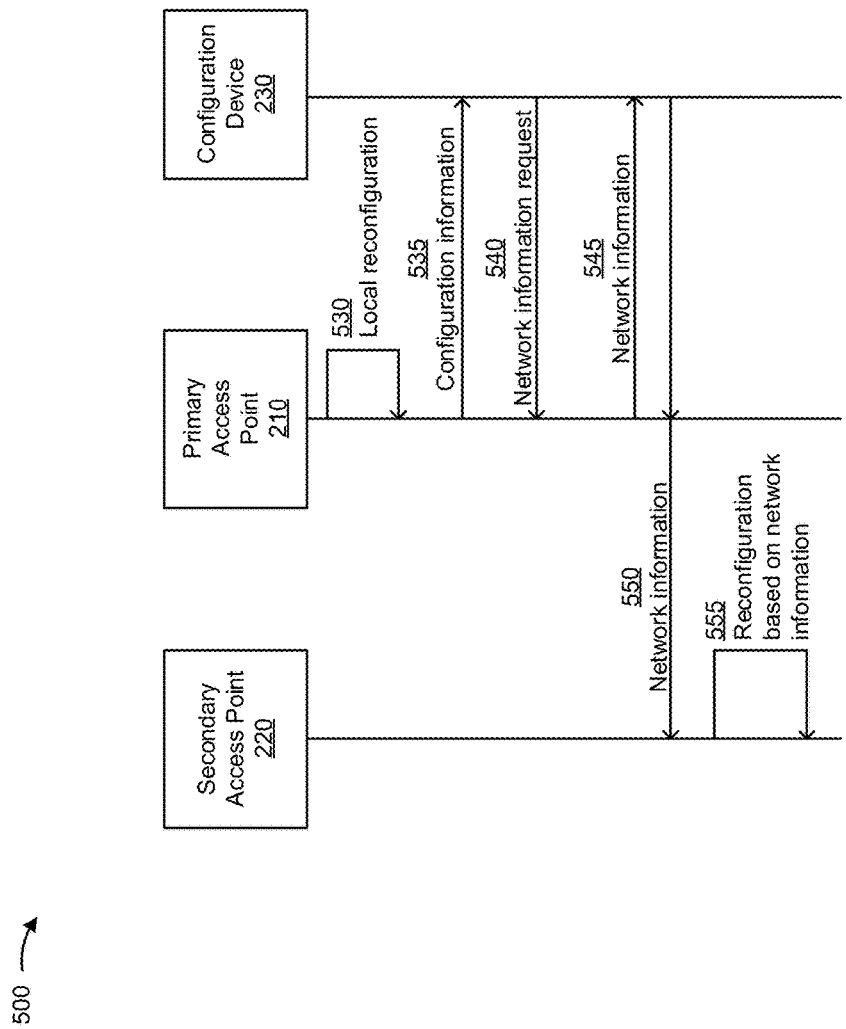
Figure 5C:
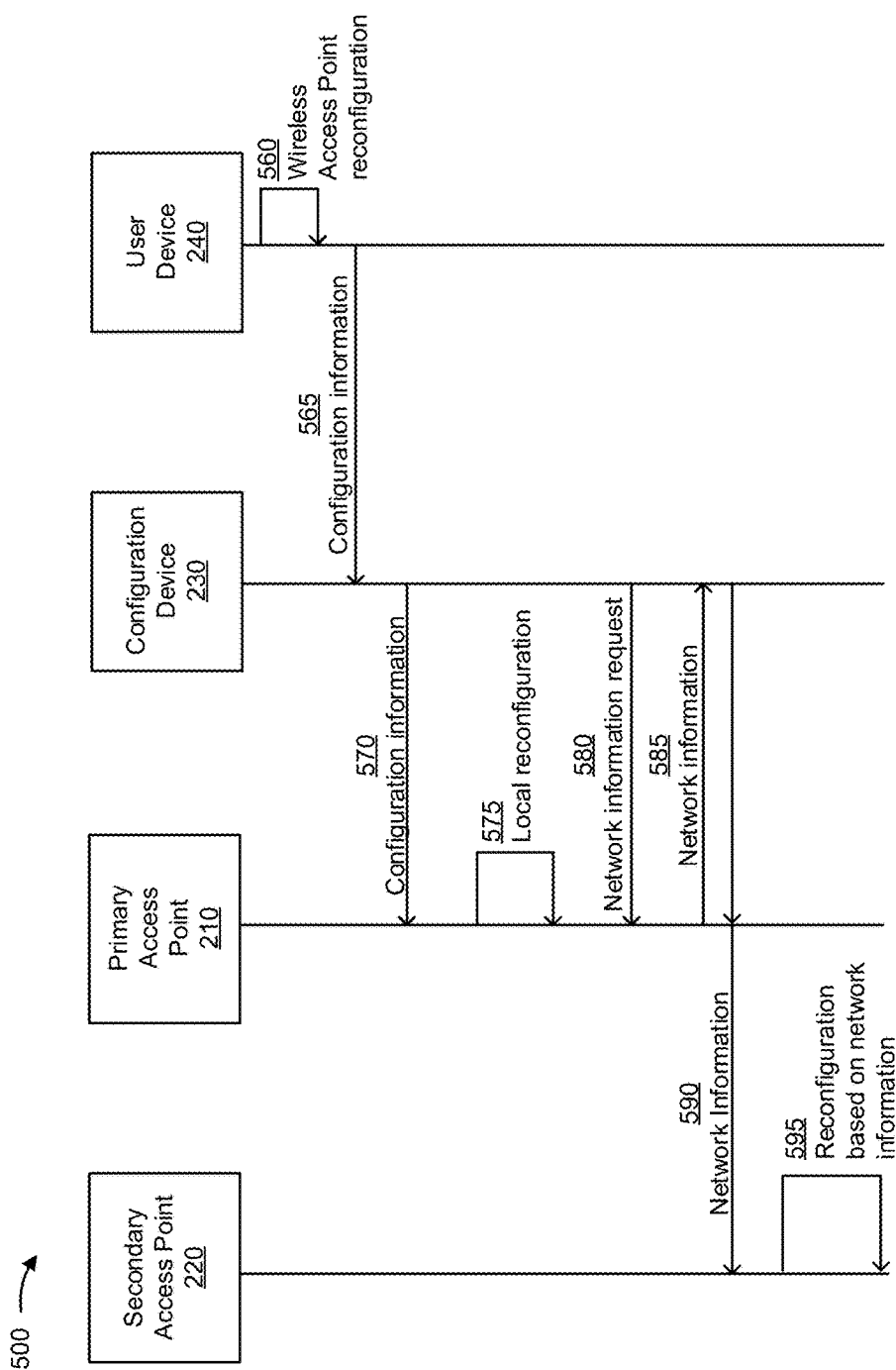

FIGS. 5A-5C are call flow diagrams of example call flows 500 for configuring a secondary access point based on network information associated with a primary access point.

As shown in FIG. 5A, and by reference number 505, secondary access point 220 may transmit activation and registration information to configuration device 230 (e.g., based on secondary access point 220 being activated and/or configured by a user). For example, secondary access point 220 may transmit the activation and registration information as part of an activation process or a registration process for secondary access point 220. As shown by reference number 510, configuration device 230 may transmit a network information request to primary access point 210 based on receiving the activation and registration information.

As shown by reference number 515, primary access point 210 may transmit network information to configuration device 230 based on receiving the network information request. The network information may identify configuration parameters of wireless network 260 used to communicate with primary access point 210. As shown by reference number 520, configuration device 230 may provide the network information to secondary access point 220. As shown by reference number 525, secondary access point 220 may be reconfigured based on the network information. For example, configuration device 230 may cause secondary access point 220 to set values of configuration parameters based on the network information. In some implementations, secondary access point 220 may communicate with configuration device 230 via primary access point 210, which may simplify implementation of secondary access point 220. Additionally, or alternatively, secondary access point 220 may communicate with configuration device 230 via external network 250, and not via primary access point 210. For example, secondary access point 220 may be connected to configuration device 230 via external network 250, which may conserve bandwidth and/or processor resources of primary access point 210.

As shown in FIG. 5B, and by reference number 530, primary access point 210 may be reconfigured locally (e.g., automatically, based on a user interaction, etc.). As shown by reference number 535, primary access point 210 may transmit configuration information to configuration device 230 based on being reconfigured. As shown by reference number 540, configuration device 230 may transmit a network information request to primary access point 210 based on receiving the configuration information. The network information request may request network information that relates to the configuration information and/or to configuration parameters of wireless network 260. As shown by reference number 545, primary access point 210 may provide the network information to configuration device 230 based on receiving the network information request. As shown by reference number 550, configuration device 230 may transmit the network information to secondary access point 220. As shown by reference number 555, secondary access point 220 may be reconfigured based on the network information. For example, configuration device 230 may provide an instruction to cause secondary access point 220 to set values of configuration parameters based on the network information.

As shown in FIG. 5C, and by reference number 560, user device 240 may receive information relating to reconfiguring a wireless access point (e.g., primary access point 210 and/or secondary access point 220). User device 240 may receive the information related to reconfiguring the wireless access point based on input provided by a network administrator, a technician, a user (e.g., via an online reconfiguration interface, etc.), or the like. As shown by reference number 565, user device 240 may transmit configuration information to configuration device 230. As shown by reference number 570, configuration device 230 may transmit the configuration information to primary access point 210. As shown by reference number 575, primary access point 210 may perform local reconfiguration based on the configuration information. For example, configuration device 230 may cause primary access point 210 to set values of configuration parameters based on the configuration information.

As further shown in FIG. 5C, and by reference number 580, configuration device 230 may transmit a network information request to primary access point 210. As shown by reference number 585, primary access point 210 may provide network information to configuration device 230 based on receiving the network information request. As shown by reference number 590, configuration device 230 may transmit the network information to secondary access point 220. As further shown in FIG. 5C, and by reference number 595, secondary access point 220 may perform reconfiguration based on the network information.

As indicated above, FIGS. 5A-5C are provided merely as an example. Other examples are possible and may differ from what was described with regard to FIGS. 5A-5C.

In this way, a configuration device improves wireless network performance and reduces degradation associated with inconsistent configuration parameters among primary and secondary access points. Further, the configuration device saves time and resources that would otherwise be used to locally and/or manually reconfigure the primary and/or secondary access points. Furthermore, the configuration device may increase access to the external network that would otherwise be impeded by misconfiguration of secondary access points.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive first information relating to a wireless local area network to be used to communicate with a first access point and one or more second access points, the first information identifying a change to one or more first configuration parameters associated with the first access point,
the first information being received from the first access point;
determine that one or more second configuration parameters have changed in response to the change to the one or more first configuration parameters;
request second information from the first access point based on the first information,
the second information including the one or more second configuration parameters,
the one or more second configuration parameters being different from the one or more first configuration parameters, and
the second information including a particular set of network information,
the particular set of network information being provided each time the second information is requested irrespective of which configuration parameters of the first access point are reconfigured,
the one or more second access points, when configured based on the second information, permitting communication via the wireless local area network;
receive the second information from the first access point;
provide, to the one or more second access points via the first access point, an instruction for configuring the one or more second access points,
the instruction including the second information and the one or more second access points being reconfigured based upon receiving the instruction.

2. The device of claim 1, where the one or more processors are further to: cause the first access point to be configured based on the first information.

3. The device of claim 1, where the one or more processors, when receiving the first information, are to:
receive the first information based on the one or more first configuration parameters of the first access point being modified.

4. The device of claim 1, where the one or more processors, when causing the one or more second access points to be configured, are to:
provide the second information to the one or more second access points,
the one or more second access points performing automatic configuration based on the second information.

5. The device of claim 1, where the one or more processors, when receiving the first information, are to:

receive the first information based on an activation or registration process of at least one of the one or more second access points.

6. The device of claim 1, where the one or more processors, when causing the one or more second access points to be reconfigured, are to:
cause the one or more second access points to provide access to the wireless local area network based on one or more credentials,
the one or more credentials permitting access to the wireless local area network via the first access point and via the one or more second access points.

7. The device of claim 1, where the one or more processors are further to:
receive the first information as part of an activation or registration process associated with the first access point.

8. A non-transitory computer-readable medium storing instructions, the instructions comprising:
one or more instructions that, when executed by one or more processors, cause the one or more processors to:
receive first information relating to a wireless local area network to be used to communicate with a first access point and by a second access point,
the first information identifying a change in one or more first configuration parameters associated with the first access point,
the first information being received from the first access point;
determine that one or more second configuration parameters have changed in response to the change to the one or more first configuration parameters;
request second information from the first access point based on the first information,
the second information including the one or more second configuration parameters,
the one or more second configuration parameters being different from the one or more first configuration parameters,
the second information including a particular set of network information,
the particular set of network information being provided each time the second information is requested irrespective of which configuration parameters of the first access point are reconfigured, and
the second access point, when configured based on the second information, permitting communication via the wireless local area network;
receive the second information from the first access point;
provide, to the second access point via the first access point, an instruction for configuring the second access point,
the instruction including the second information, and the second access point being reconfigured based upon receiving the instruction.

9. The non-transitory computer-readable medium of claim 8, where the one or more instructions, that cause the one or more processors to cause the second access point to be reconfigured, cause the one or more processors to:
cause the second access point to provide access to the wireless local area network based on one or more credentials,
the one or more credentials permitting access to the wireless local area network via the first access point and via the second access point.

10. The non-transitory computer-readable medium of claim 8, where the one or more instructions, when executed by the one or more processors, cause the one or more processors to:
cause the first access point to be reconfigured based on the first information.

11. The non-transitory computer-readable medium of claim 8, where the one or more instructions, that cause the one or more processors to receive the first information, cause the one or more processors to:
receive the first information based on an activation or registration process of the second access point.

12. The non-transitory computer-readable medium of claim 8, where the one or more first configuration parameters include at least one of:
a service set identifier associated with the wireless local area network,
a credential for accessing the wireless local area network,
an encryption type associated with the wireless local area network, or
a beacon interval range of the first access point or the second access point.

13. The non-transitory computer-readable medium of claim 8, where the one or more instructions, that cause the one or more processors to receive the first information, cause the one or more processors to:
receive the first information based on the first access point being reconfigured.

14. The non-transitory computer-readable medium of claim 8, where the one or more instructions, that cause the one or more processors to cause the second access point to be reconfigured, cause the one or more processors to:
provide the second information to the second access point,
the second access point performing automatic configuration based on the second information.

15. A method, comprising:
receiving, by a device, configuration information relating to a Wi-Fi network,
the Wi-Fi network to be used to communicate with a first access point and by one or more second access points, and
the configuration information identifying a change in one or more first configuration parameters, of the first access point, that are related to providing or accessing the Wi-Fi network,
the configuration information being received from the first access point, and
the first access point providing access to the Wi-Fi network based on one or more credentials;
determining, by the device, that one or more second configuration parameters have changed in response to the change to the one or more first configuration parameters;
requesting, by the device and from the first access point, network information based on the configuration information,
the network information including the one or more second configuration parameters,
the one or more second configuration parameters being different from the one or more first configuration parameters, and
the network information including a particular set of network information,
the particular set of network information being provided each time the network information is requested irrespective of which configuration parameters of the first access point are reconfigured,
the one or more second access points, when configured based on the network information, providing access to the Wi-Fi network based on the one or more credentials;
receiving, by the device, the network information from the first access point;
providing, by the device, an instruction for reconfiguring the one or more second access points,
the instruction including the network information, and
the one or more second access points being reconfigured based upon receiving the instruction.

16. The method of claim 15, where causing the one or more second access points to be configured comprises:
providing the network information to the one or more second access points to cause the one or more second access points to be automatically configured based on the network information.

17. The method of claim 15, further comprising:
causing the first access point to be configured based on the configuration information.

18. The method of claim 15, where receiving the configuration information comprises:
receiving information indicating that a particular second access point, of the one or more second access points, is associated with an activation or registration process; and
where requesting the network information comprises:
requesting the network information based on the particular second access point being associated with the activation or registration process.

19. The method of claim 15, where the one or more first configuration parameters identify a modification to the one or more credentials.

20. The method of claim 15, where receiving the configuration information comprises:
receiving the configuration information based on the one or more first configuration parameters of the first access point being modified.

* * * * *